United States Patent [19]

Rambosek

[11] 3,880,782

[45] *Apr. 29, 1975

[54] FLUOROCHEMICAL FOAM STABILIZER AND FOAMED ISOCYANATE-DERIVED POLYMERS MADE THEREWITH

[75] Inventor: George M. Rambosek, Village of Maplewood, Minn.

[73] Assignee: Minnesota Mining and Manufacturing Company, St. Paul, Minn.

[ * ] Notice: The portion of the term of this patent subsequent to Jan. 18, 1989, has been disclaimed.

[22] Filed: Mar. 16, 1970

[21] Appl. No.: 20,012

Related U.S. Application Data

[63] Continuation-in-part of Ser. No. 840,854, July 10, 1969, Pat. No. 3,635,848, which is a continuation-in-part of Ser. No. 618,035, Feb. 23, 1967, abandoned.

[52] U.S. Cl.................... 260/2.5 AG; 260/2.5 AM; 260/2.5 AW
[51] Int. Cl...................... C08g 22/44; C08g 33/04
[58] Field of Search. 260/2.5 AG, 2.5 AM, 2.5 AW, 260/77.5 AM, 75 TN

[56] References Cited
UNITED STATES PATENTS

| | | | |
|---|---|---|---|
| 3,255,131 | 6/1966 | Ahlbrecht. | 260/77.5 X |
| 3,332,892 | 7/1967 | Middleton | 260/2.5 |
| 3,380,943 | 4/1968 | Enders | 260/77.5 X |
| 3,413,271 | 11/1968 | Weesner | 260/2.5 X |
| 3,429,856 | 2/1969 | Hoeschele | 260/77.5 |
| 3,450,755 | 1/1969 | Ahlbrecht | 106/287 |
| 3,458,571 | 7/1969 | Tokoli | 106/287 X |
| 3,516,950 | 6/1970 | Haggis | 260/2.5 |
| 3,634,345 | 1/1972 | Diehr | 260/2.5 AW |
| 3,635,848 | 1/1972 | Rambosek | 260/2.5 AW |
| 3,697,485 | 10/1972 | Rambosek et al. | 260/2.5 AW |

FOREIGN PATENTS OR APPLICATIONS

| | | | |
|---|---|---|---|
| 908,337 | 10/1962 | United Kingdom | 260/2.5 AW |
| 994,411 | 6/1965 | United Kingdom | 260/2.5 |
| 1,807,953 | 6/1969 | Germany | 260/2.5 |

OTHER PUBLICATIONS

Dahm; Cellular Plastics; National Academy of Sciences Publication 1462; pp. 52 to 63.
Boudreau; Modern Plastics; January 1967; pp. 133–135, 138, 143–144, 147, 234 and 239–240.
I&EC, Vol. 56, Sept. 1964, pp. 26–31.

Primary Examiner—Donald E. Czaja
Assistant Examiner—C. Warren Ivy
Attorney, Agent, or Firm—Alexander, Sell, Steldt and DeLaHunt

[57] ABSTRACT

Active hydrogen-containing fluorochemical is used as a foam stabilizer for foamed isocyanate-derived polymers. For example, rigid or flexible polyurethane foams with high or low density and uniform cellular structure are prepared using fluoroaliphatic radical-substituted polyamines as foam stabilizers.

16 Claims, No Drawings

FLUOROCHEMICAL FOAM STABILIZER AND FOAMED ISOCYANATE-DERIVED POLYMERS MADE THEREWITH

CROSS-REFERENCE TO RELATED APPLICATION

This application is a continuation-in-part of my copending application, Ser. No. 840,854, filed July 10, 1969, now U.S. Patent 3,635,848, which in turn is a continuation-in-part of copending application, Serial No. 618,035, filed February 23, 1967, now abandoned.

This invention relates to foamed isocyanate-derived polymers and their preparation. In another aspect, it relates to active hydrogen-containing fluorochemicals, such as fluoroaliphatic-substituted polyamines, and their use as foam stabilizers in the preparation of foamed isocyanate-derived polymers, e.g. polyurethanes and polyisocyanurates.

The foamed (or cellular) polyurethane industry has enjoyed spectacular growth in the last decade. These foamed polymers are reaction products of polyisocyanates and active hydrogen-containing materials. Though there are three common foaming techniques used (i.e., one-shot, prepolymer, and semi-prepolymer techniques), these techniques all involve the reaction of these materials in the presence of catalysts, a blowing agent such as a fluorocarbon or carbon dioxide, and a foam stabilizer or surface active agent. The blowing agent expands the reaction product during the reaction to produce a foamed or cellular structure, the foam stabilizer aiding in controlling the cell structure to promote its uniformity and fineness. The foamed polyurethane can be produced as a flexible or rigid product of high or low density. Such cellular products can be made with a wide range of properties, the low density rigid foams generally being useful as foamed-in-place thermal insulation, the high density rigid foams being generally useful where structural strength is important, such as in construction, and the flexible cellular products being generally useful for cushioning, packaging, laminates, and insulation.

In general, the physical properties of the cellular product depend not only upon the particular reactants employed and their ratios but also upon the uniformity and size of the cells or voids within the product and whether the cells are open or closed. In order to prevent the development of non-uniform, coarse or large cells, or the collapse of the foam, it is common to include in the reaction system a foam stabilizer or cell size regulating agent. The most widely used foam stabilizers are silicone oils such as polydialkylsiloxanes and polyoxyalkylenesiloxane copolymers, e.g. Silicone L-520, such as described in British Patent 1,114,428. These surfactants are made in a variety of molecular weights, solubilities, and viscosities to prepare cellular products having various cell sizes. Though useful cellular structures can be made with said silicone surfactants, the resulting cellular products often do not readily adhere to adhesives and substrates (which is typical of silicone-modified materials) and, in order to obtain uniform cell size, careful control must be used in choosing the right surfactant and catalyst and the amounts thereof must be extremely carefully balanced.

Briefly, in one aspect of this invention, cellular isocyanate-derived polymers, such as polyurethane, polyisocyanurate, and polyurethane-polyisocyanurate products, are prepared by foaming the precursor reaction mixtures thereof in the presence of fluorine-containing compound having a plurality of active hydrogen atoms. These fluorine-containing compounds (also referred to herein as foam stabilizers) can be described as fluoroaliphatic radical-substituted active hydrogen-containing compounds. A preferred class can be expressed in terms of the formula:

$$(R_f)_m Q_z (H)_n$$

where $R_f$ is a fluorinated, saturated, usually monovalent, aliphatic radical, H is an active hydrogen atom, present as part of a functional group, such as hydroxyl, amino, imino, mercapto, carboxyl, and phosphate, Q is a linkage or bridge free of active hydrogen atoms and having a valence equal to $m + n$, $m$ being an integer which is at least 1 and can be as high as 6 or higher, $n$ being an integer of at least 2 and can be as high as 5 or higher (e.g. as high as 100), and $z$ is an integer of 1–3.

The term "active hydrogen atom" as used in this application means a hydrogen atom (other than an amido hydrogen atom) which is reactive with a Grignard reagent as described in J. Am. Chem. Soc., 49, 3181, 1927. Amido hydrogen atoms, such as those present in $-SO_2NH-$ and $-CONH-$, are difficult to react with the isocyanate moiety under urethane bond forming conditions and therefore are not considered as active hydrogen atoms for purposes of this invention.

An example of a foam stabilizer of this invention has the formula:

$$C_8F_{17}SO_2NH(CH_2)_2NH(CH_2)_2NH(CH_2)_2NH_2$$

In terms of formula I, the $R_f$ of this compound is $C_8F_{17}-$, Q is

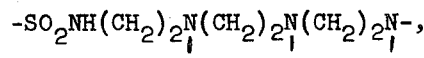

$m$ is 1, $n$ is 4, and $z$ is 1.

In preparing foamed isocyanate-derived polymer products according to this invention, reactants comprising polyisocyanate can be reacted and foamed in a conventional manner, in the presence of known isocyanate trimerization or urethane bond-forming catalysts or mixtures of such catalysts, blowing agents, and other known adjuvants, together with one or more of the foam stabilizers of this invention. For example, foamed polyurethanes can be prepared by reacting polyisocyanates with a polyfunctional organic material containing active hydrogen atoms according to the one-shot, prepolymer, or quasi-prepolymer techniques in the presence of the foam stabilizers of this invention. The resulting foamed or cellular product generally will have a high percentage of uniform cells or voids and desirable physical properties, and also have a surface which readily adheres to common adhesives, such as acrylate-based, pressure-sensitive adhesives, or to non-porous substrates, such as steel panels.

The fluoroaliphatic radicals, $R_f$, of the foam stabilizers of this invention are stable, inert, non-polar moieties which are both oleophobic and hydrophobic. They can be straight chain, branched chain, and, if sufficiently large, cyclic, or combinations thereof, such as alkylcycloaliphatic radicals. The skeletal chain can include catenary oxygen and/or trivalent nitrogen hetero atoms bonded only to carbon atoms, such hetero atoms providing stable linkages between fluorocarbon groups and not interfering with an inert character of the radical. While $R_f$ can have a large number of carbon atoms, compounds where $R_f$ is not more than 20 carbon atoms will be adequate and preferred since large radicals usually represent a less efficient utilization of fluorine than is possible with smaller $R_f$ radicals. Generally, $R_f$ will have 4 to 20 carbon atoms, preferably 6 to about 12 and will contain 40–78 weight percent, preferably 50–78 weight percent, of fluorine. The terminal portion of the $R_f$ group has preferably at least three fully fluorinated carbon atoms, e.g. $CF_3CF_2CF_2—$, and the preferred foam stabilizers are those in which the $R_f$ group is fully or substantially completely fluorinated, as in the case where $R_f$ is perfluoroalkyl, $C_nF_{2n+1}$. Generally, the foam stabilizer will contain about 4 to 68 weight percent fluorine. If the fluorine content is less than about 4 weight percent, impractically large amounts of the foam stabilizer will generally be required.

The linkage or bridge Q can be a polyvalent, usually at least divalent, linking group, the function of which is to bond the fluoroaliphatic radicals, $R_f$, to one or more of the functional groups containing active hydrogen atoms. Said functional groups, devoid of said active hydrogen atoms, can be considered as part of Q. Q can also comprise one or more linking groups such as polyvalent aliphatic, e.g. $—CH_2-CH_2—$, and $—CH_2CH(CH_2O)_2$, polyvalent aromatic, e.g.

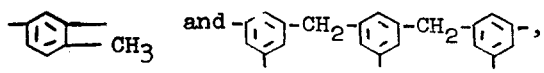

oxy, thio, carbonyl, sulfone, sulfoxy, imino, e.g. $—NH—$ and $—N(C_2H_5)—$, and combinations thereof, such as oxyalkylene, iminoalkylene, iminoarylene, sulfonamido, carbonamido, sulfonamidoalkylene, and carbonamidoalkylene, urethane, e.g. $—CH_2CH_2OCONH—$ and

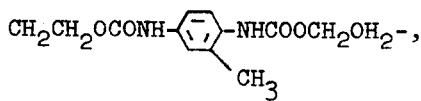

and urea, e.g. $—NHCONH—$. The linkage Q for a specific compound useful as a foam stabilizer will be dictated by the ease of preparation of such a compound and the availability of necessary precursors thereof.

From the above description of Q, it is apparent that this linkage can have a wide variety of structure. However large Q is, the fluorine content (the locus of which is $R_f$) of the compound is in the aforementioned limits set forth in the above description. While only one $R_f$ radical is sufficient to produce foamed products with desirable properties, i.e., where $m$ in formula I is 1, the foam stabilizers of this invention can have a plurality of $R_f$ radicals, e.g. $m$ can be 2 to 6, or higher.

A preferred subclass of foam stabilizers which can be used in this invention are the perfluoroalkyl amines described in U.S. Pat. No. 3,378,399 (Rambosek), the disclosure of which is incorporated herein by reference. These compounds have the formula:

$$R_fZNH_2$$

wherein $R_f$ is perfluoroalkyl of 4 to 12 carbon atoms, and Z is a linking group such as the following.

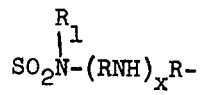

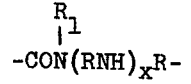

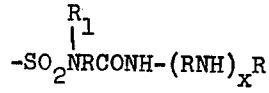

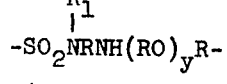

where $R_1$ is hydrogen or alkyl of 1 to 6 carbon atoms, R is alkylene of 2 to 12 carbon atoms, $x$ is zero or an integer of 1 to 8 or higher, e.g. up to 100 or more, and $y$ is an integer of 1 to 8 or higher.

Representative foam stabilizers which can be used in this invention include:

$C_4F_9SO_2NHC_2H_4NHC_4NH_2$
$C_8F_{17}SO_2NHC_2H_4NHC_2H_4NH_2$
$C_{12}F_{25}SO_2NHC_2H_4NHC_2H_4NH_2$
$C_8F_{17}SO_2NHC_3H_6NHC_3H_6NH_2$
$C_8F_{17}SO_2NH(CH_2)_2NH(CH_2)_2NH(CH_2)_2NH_2$
$C_8F_{17}SO_2NHC_2H_4NH_2$
$C_8F_{17}SO_2NH(CH_2)_6NH_2$

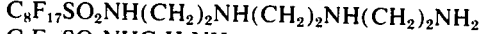

$C_7F_{15}CONHC_2H_4NHC_2H_4NH_2$
$C_7F_{15}CONHC_2H_4NHC_2H_4NH_2$
$C_8F_{17}SO_2N(C_2H_5)CH_2CONHC_2H_4NHC_2H_4NH_2$
$C_8F_{17}SO_2N(C_2H_5)CH_2CH_2NH_2$
$C_8F_{17}SO_2N(C_2H_5)CH_2CH_2NH(CH_2)_6NH_2$
$C_8F_{17}SO_2N(C_2H_5)(C_2H_4NH)_3H$
$C_8F_{17}SO_2N(C_2H_5)(C_2H_4NH)_2H$

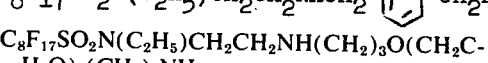

$C_8F_{17}SO_2N(C_2H_5)CH_2CH_2NH(CH_2)_3O(CH_2CH_2O)_2(CH_2)_3NH_2$
$C_8F_{17}SO_2N(CH_3)(CH_2)_{11}NH(CH_2)_6NH_2$
$C_8F_{17}(CH_2)_3NHC_2H_4NHC_2H_4NH_2$
$CF_3CF(CF_2H)(CF_2)_{13}CONHCH_2CH(OH)CH_2OH$
$C_8F_{17}SO_2N(C_2H_5)CH_2(CHOH)_4CH_2OH$
$C_8F_{17}SO_2N(C_2H_5)CH_2OP(O)(OH)_2$

Other useful foam stabilizers within the scope of formula I of this invention are disclosed in U.S. Pats. Nos. 3,378,399 (Rambosek), 3,128,272 (Wear et al.), 3,217,035 (LaZerte et al.), 3,478,116 (Smeltz), 3,450,755 (Ahlbrecht), 3,458,571 (Tokoli).

The particular foam stabilizer and amount thereof chosen for making a foamed product in accordance with this invention will depend upon its solubility in the particular isocyanate reaction mixture being foamed, the catalyst used, and the properties desired in the foam product. Foam stabilizers having a high fluorine content and/or a high molecular weight can be used in lower amounts. Amounts as high as 20 weight percent, based on the weight of the total reaction mixture formulation or resin, can be used but generally it will be uneconomical and unnecessary to use such high amounts. Amounts less than about 0.1 weight percent will be generally ineffective. Usually 0.1 to 5 weight percent of foam stabilizer will provide satisfactory foams with a high percent of uniform cells. Functionally stated, the amount of foam stabilizer to use will be a foam stabilizing amount.

Isocyanate reactant material, including isocyanate-capped prepolymers, as well as isocyanate-polyol reaction mixtures, which can be polymerized in the presence of catalysts, blowing agents, and the foam stabilizers of this invention, to make foamed isocyanate-derived polymers, such as polyisocyanurates, urethane-modified polyisocyanurates, and isocyanurate-modified polyurethanes, are conventional and are disclosed in my copending application, Ser. No. 804,854.

In using the foam stabilizers of this invention, conventional polyurethane foaming techniques can be followed (e.g. the same techniques followed when conventional silicone oils are used as foam stabilizers). Such conventional foaming techniques, including the one-shot, prepolymer, and quasiprepolymer techniques, and the reactants and adjuvants used in making foamed polyurethanes, including polyisocyanate and active hydrogen-containing reactants, catalysts, blowing agents, fillers, nucleation agents, and other adjuvants are also described, for example in "Polyurethanes: Chemistry and Technology," by Saunders & Frisch, Interscience Pub., Part I (1962), especially Chap. V and Part II (1964), especially Chaps. VII and VIII, and "Handbook of Foamed Plastics," by Bender, Lake Pub. Corp. (1965), especially Secs. IX, X, and XI, and such patents as U.S. Pat. No. 3,423,399.

Generally, the polyisocyanate reactant (which can be in admixture with active hydrogen-containing reactant, e.g. poly(oxypropylene) polyol), catalyst, blowing agent (usually water and/or halomethanes, e.g. Freon 11 or 12), and foam stabilizer of this invention will be mixed together in a blender or mixing chamber. The foam mix can be transferred to suitable mold or cavity to be filled or extruded onto a moving belt or the like. The foam mix can also be applied to large surfaces by spraying. If desired, one or more of the ingredients can be preheated before mixing takes place. Process conditions, such as temperature, pressure, reaction time, and order of addition will be conventional and are not critical. The foam stabilizer can be premixed with the polyisocyanate component or polyol component, depending on its solubility in these components. For some reaction mixtures or foam stabilizers, it may be desirable to add the foam stabilizer to the reaction mixture or reactant component thereof in a solvated form (e.g. as a solution in a solvent such as methyl ethyl ketone or an alkaline methanol) or to heat the reaction mixture or foam stabilizer, in order to get a better dispersion of the foam stabilizer in the reaction mixture, and thereby produce a foamed product with a higher percentage of uniform small cells.

The amount of polyisocyanate reactant used to make the cellular products of this invention can vary, depending on the particular cellular product desired and its properties. Generally, for polyurethane or polyurethane-polyisocyanurate products, the amount of polyisocyanate reactant can be in the range of 0.9 to 12 equivalents of isocyanato groups per equivalent of active hydrogen atom in the polyol reactant, and even higher, e.g. up to 20/1 to 40/1. Those cellular products made from reaction mixture with isocyanato-to-active hydrogen atom equivalent ratios of 0.9/1 to 5/1, particularly 0.9/1 to 1.5/1, can be characterized as polyurethanes, while those having higher ratios, particularly where the reaction mixture includes an isocyanate trimerization catalyst as well as a urethane bond forming-catalyst, can be characterized as polyisocyanurate-polyurethanes, these polymers being highly crosslinked and having both isocyanurate linkages and urethane linkages in the polymer backbone with the amount of the isocyanate groups in the polyisocyanate reactant converted to isocyanurate linkages being 20–80%. (A portion of the hydroxyl content necessary to satisfy a desired NCO/OH equivalent ratio can be replaced by $-NH_2$ groups, particularly where high strength foams are desired.) If water is used as a blowing agent, urea linkages will be formed also.

Catalysts which can be used to make foamed isocyanate-derived polymers, using the foam stabilizers of this invention, include those used heretofore. For example, to make polyurethanes, the polyol soluble organic compounds and certain compounds of polyvalent metals, such as tin, lead, or mercury (see Brit. Patent No. 1,053,383). Examples of such catalysts are phenylmercuric acetate, phenylmercuric oleate, mercuric octoate, mercuric naphthenate, lead octoate, lead naphthenate, dibutyl tin dilaurate, dibutyl tin diacetate, and similar compounds, tertiary amines, and mixtures of such catalysts.

An especially useful catalyst for making isocyanatederived polymers with isocyanurate linkages is that disclosed in my earlier copending application, Ser. No. 840,854, the entire disclosure of which is incorporated herein by reference. In that copending application, coordination compounds or complexes of an organic borate ester and a base metal are disclosed as useful catalysts for trimerizing isocyanates to produce isocyanurate polymers, isocyanurate-modified polyurethanes or urethane-modified polyisocyanurates (or mixed polyurethanes-polyisocyanurates). An example of a coordination compound useful as a catalyst for this purpose is one formed from a boric acid tetraester of triethylene glycol and an alkali or alkaline earth metal, e.g. sodium or potassium, or a hydride, alcoholate, phenolate, or carboxylic acid or hydroxide of said metal, the coordination compound having an atom ratio of base metal to the boron atom in the complex of 2/1 to 1/2 or as low as 1/10. A specific example is $[B(O-CH_2CH_2-O-CH_2CH_2-O-CH_2CH_2-OH)_4]^-M^+$, where M is a cation of sodium or potassium, with a M/B atom ratio of 1/1. Such catalysts can be used as the sole essential catalyst for forming such products or used in combination with the conventional urethane catalysts described above.

Both rigid and flexible foamed polyurethanes, with high or low density, can be prepared using the foam stabilizers of this invention. Product densities can vary from as high as 50 lbs./ft$^3$, or higher, such as required for abrasion-resistant coatings, or as low as 1 lb./ft$^3$, or less, such as desirable for thermal insulation, although usually the product density will be in the range of 2 to 25 lbs./ft$^3$.

The cellular products produced according to this invention can be used in the same applications that cellular polyurethanes have enjoyed heretofore. Rigid cellular products can be used as thermal insulation for refrigerators, freezers, cold storage warehouses, insulated railroad cars, pipes, and the like. Flexible cellular products of this invention can be used for cushioning, packaging, laminates, sound and thermal insulation, and filtration applications. The cellular products having a higher percentage of isocyanurate linkages will have particular utility where high temperature resistance is desired. For example, they can be used in the form of wall panels for the interior of aircraft. The cellular products of this invention having high isocyanurate content, particularly those made with the catalytic coordination compounds described in my copending application, Ser. No. 840,854, are superior to conventional polyurethanes and polyisocyanurates because in addition to having a highly uniform density gradient, isotropic cell structure, desirable physical properties (such as compression strength, modulus, tensile strength and elongation) they are relatively nonflammable and have low smoke density rating, low smoke obscuration index, and low hydrogen cyanide formation upon pyrolysis, and have high dimensional stability, properties which are particularly useful in materials used as paneling for aircraft interiors.

Objects and advantages of this invention are further illustrated by the following examples, but it should be understood that the various materials and amounts thereof and the various steps, conditions, details and results, set forth in these examples should not be construed to unduly limit this invention. In these examples, the parts recited are parts by weight.

EXAMPLE 1

A mixture of 100 parts polyoxypropylene tetrol (G-640 with an equivalent weight of 150), 4 parts water, 0.1 part dibutyl tin dilaurate, 0.1 part N-ethylmorpholine, and 1.5 parts of perfluoroalkyl amine, $C_8F_{17}SO_2N(C_2H_5)(CH_2)_2NH(CH_2)_2NH(CH_2)_2NH_2$, was mixed with 97 parts of tolylene diisocyanate (an 80:20 mixture of the 2,4 and 2,6 isomers). The reaction mixture, having an NCO/OH equivalent ratio of 1.05/1, was mixed at ambient temperature to provide a low density rigid polyurethane foam having a density of about 2 lbs./ft$^3$ and a high percentage of uniform, closed cells.

EXAMPLE 2

A mixture (Part A) of 80 parts polyoxypropylene triol (Thanol F-3002, having an equivalent weight of 1000), 20 parts polyoxypropylene diol (PPG-2025, having an equivalent weight of 1000), 2 parts water, 1 part N-ethylmorpholine, 1 part dibutyl tin dilaurate, and 1 part of the perfluoroalkyl amine used in Example 1, was mixed with 38 parts of the tolylene diisocyanate used in Example 1. The reaction mixture, having an NCO/OH equivalent ratio of 1.37/1.0, was mixed at ambient temperature to provide a flexible polyurethane foam having a density of about 3 lbs./ft$^3$ and a high percentage of uniform cells.

The above procedure was repeated, except that Part A contained 1.5 parts of the perfluoroalkyl amine. The resulting flexible polyurethane foam also had a high percentage of cells though they were smaller than that of the above-prepared flexible foam.

EXAMPLE 3

Twenty-five parts of a mixture of equal amounts of two polyoxypropylene triols (TP-440, having an equivalent weight of 150, and TP-740, having an equivalent weight of 250), were mixed with 6 parts of a sodium tetraborate catalyst, 1 part water, and 0.3 part of the perfluoroalkyl amine used in Example 1. The resulting mixture (Part A) was then mixed at ambient temperature with 90 parts of an isocyanate-terminated prepolymer, the relative NCO/OH equivalent ratio of the resulting reaction mixture being 2.1/1.0. A semi-rigid urethane-modified polyisocyanurate foam with uniform, closed cells was produced within 15 minutes.

In another run, the above procedure was repeated, except that 180 parts of the isocyanate-terminated prepolymer were mixed with Part A, the resulting mixture having an NCO/OH equivalent ratio of 4.2/1.0. A rigid-urethane-modified polyisocyanurate foam also resulted within 15 minutes.

The sodium tetraborate catalyst used in preparing the foams described above was made by reacting 2.3 moles of vacuum-dried triethylene glycol with 0.21 mole of sodium borohydride at 110°–130°C. under vacuum. The resulting sodium tetraborate $[B(O-CH_2CH_2-O-CH_2CH_2-O-CH_2CH_2-OH)_4]^- Na^+$, had a equivalent Na/B atom ratio of 1/1.

The isocyanate-terminated prepolymer used in preparing the above foams was one having a viscosity of 450–950 cps. and an isocyanate number of 171–175, and was made by reacting 67 parts of toluene diisocyanate (Nacconate 80) with a mixture of 17.3 parts of a 200-molecular weight polypropylene ether glycol and 16 parts of a 2000-molecular weight polypropylene ether glycol.

EXAMPLE 4

Twenty-five parts of a mixture of equal amounts of the two polypropylene ether triols used in Example 3 were mixed with 0.4 part of bis(2-dimethylaminoethyl) ether in dipropylene glycol (a tertiary amine product sold as NIAX Catalyst A-1), 0.45 part water, 0.4 parts of the perfluoroalkyl amine used in Example 1, 10.0 parts of a high molecular weight polyvinyl chloride (sold as PVC 71 AH, with an inherent viscosity of 1.30 and a specific viscosity of 0.057), and 8.9 parts of $Sb_2O_3$. Fifty parts of the resulting mixture, Part A, were mixed with 250 parts of the NCO-capped prepolymer described in Example 3 at room temperature, the resulting mixture having an NCO/OH equivalent ratio of 10/1. The mixture gelled within 15 min. to produce a rigid urethane-modified polyisocyanurate foam with a high percentage of uniform, fine, closed cells. This product had a density of 20–25 lbs./ft$^3$ and it was self-extinguishing, nailable, and machinable. These properties are essentially retained when the product was heated in air to 350°F.

The sodium tetraborate catalyst used in preparing the above foam was prepared as follows. A flask, fitted with thermometer, stirrer, and water trap, was charged with 4.5 moles of triethylene glycol and 0.75 mole of powdered boric acid. The resulting mixture was heated to about 130°C. under vacuum until the evolution of by-product water ceased. The reaction mixture was then cooled to about 60°C. and a total of 0.75 mole of small particles of metallic sodium was added in three equal portions. After all the sodium had been added, the reaction mixture was then heated to about 130°C. under vacuum, the by-product hydrogen gas being removed, and the mixture then cooled. The tetraalkoxyborate ester reaction product, $[B(O-CH_2CH_2-O-CH_2CH_2-O-CH_2CH_2-OH)_4]^- Na^+$ in excess triethylene glycol (1.5 moles), was an amber-colored liquid with a Na/B atom ration of 1/1.

EXAMPLE 5

A series of three runs was carried out following the procedure described in Example 4. In each run, Part A was made up of 6.0 parts of polypropylene ether triol with a molecular weight of 440, 12.5 parts of a similar triol with a molecular weight of 740, 6.5 parts of the sodium tetraborate catalyst used in Example 3, 0.25 parts of THANCAT DME tertiary amine, and 0.2 part of the perfluoroalkyl amine used in Example 1. The amount of the NCO-capped prepolymer, Part B, varied in each run (30, 75, or 125 parts) to vary the NCO/OH equivalent ratio in the resulting mixtures. Table I below summarizes the runs, together the certain physical properties that were determined on the resulting rigid foamed products, all of which had a high percent of uniform, closed cells.

TABLE I

|  | Run 1 | Run 2 | Run 3 |
|---|---|---|---|
| NCO/OH equivalent ratio | 1.1/1.0 | 2.7/1.0 | 4.5/1.0 |
| Density of product g/cc | 0.14 | 0.24 | 0.32 |
| Pressure (psi) to compress at 300°C. to: |  |  |  |
| 10% | 2 | 18 | 180 |
| 25 | 3 | 39 | 218 |
| 50 | 7 | 51 | 358 |

Another series of three runs was carried out in a similar manner as the above-described series, except that 0.3 part of THANCAT DME tertiary amine and 0.4 part water were used in each run. Certain physical properties of the resulting rigid foamed polymer products, which had densities of about 6–12 lb./ft³ desnity (0.095–0.20 gm/cc), were determined, this series of runs and results obtained are summarized below in Table II.

TABLE II

|  | Run 4 | Run 5* | Run 6 |
|---|---|---|---|
| NCO/OH equivalent ratio | 1.05/1.0 | 2.0/1.0 | 3.0/1.0 |
| Wt. % water absorption after 24 hrs.** | 20 | 35 | 33 |
| Tensile strength, psi | 160 | 82 | 65 |
| Elongation, % | 70 | 7.5 | 3.5 |
| Pressure (psi) to compress to 50% at room temp. | 117 | 107 | 97 |
| Amt. of HCN evolved by pyrolysis at about 1500°F., wt. % | 0.04 | 0.035 | 0.017 |

*In a repeat run, this sample had a tensile strength of 180 psi, a tear strength of 23 lbs./linear inch and the amount of pressure to compress the sample 50% at −67°F., 72°F., 200°F., and 300°F. was 350, 180, 30, and 3 psi, respectively.
**The absorption values obtained are relatively high due to the hand-mixing procedure used in preparing the products and which produced some large voids; if mixing were performed in conventional urethane foam-making machine, considerably less moisture would be picked up and the products would have a higher percentage of uniform, closed cells, devoid of large voids.

EXAMPLE 6

A flask, fitted with a thermometer, stirrer and dry gas bleed, was charged with 1000 parts of polypropylene ether triol (440 MW) and vacuum dried at 30 mm Hg pressure with dry gas bleed at 100°–110°C. for 1 hr. To the dehydrated triol was added 8 parts of sodium borohydride and the dehydration conditions were maintained until the reaction of the NaBH$_4$ and glycol was complete. The resultant "catalyzed" polyol product was cooled and placed in closed glass container. This product had a Na/B ratio of 1/1.

In each of a plurality of runs, to 6.5 parts of the catalyzed polyol were added 6.0 parts of 440-molecular weight polypropylene ether triol, 12.5 parts of a 740-molecular weight polypropylene ether glycol, 0.2 part of water, 0.25 part of THANCAT DME tertiary amine and 0.25 part of a perfluoroalkyl amine. Each composition was mixed well until all components were solubilized. Each composition was stirred at about 150°–200°F. to assist solubility of the perfluoroalkyl amine in the polypropylene ether polyols.

After cooling each composition to room temperature, 50 parts of NCO-prepolymer described in Example 3 was added to provide a reaction mixture having an NCO/OH equivalent ratio of 1.75/1 and the mixture was stirred until creaming was initiated. The cream material was poured into a container and in each run rigid isocyanurate-modified polyurethane foam was produced within 15 min.

The perfluoroalkylamines used in the runs described above are listed in Table III below, together with the foam quality of the resulting product in which they were used. The designation "good" foam quality means that the foam that was produced was stable and uniform and of the closed cell type, whereas a "poor" foam quality means that the pores of the foam were not uniform and the foam was weak and of higher density due to collapse of cells. Those perfluoroalkylamines used in Runs 1, 2 and 3 had the greatest lowering of the surface tension of the polyol used in the preparation of the foams. When using perfluoroalkylamines, in order to get a good quality foam, the perfluoroalkylamine should be dispersed and it may be necessary to solvate the perfluoroalkylamine in order to obtain such dispersion.

TABLE III

| Run | Perfluoroalkylamine | Foam Quality |
|---|---|---|
| 1 | $C_8F_{17}SO_2N(C_2H_5)(CH_2)_2NH(CH_2)_2NH(CH_2)_2NH_2$ | good |
| 2 | $C_8F_{17}SO_2NHC_2H_4NH_2$ | good |
| 3 | $C_7F_{15}CON(CH_3)C_2H_4NHC_2H_4$-⟨C$_6$H$_4$⟩-$CH_2NH_2$ | good |
| 4 | $C_7F_{15}CONHC_2H_4NHC_2H_4NH_2$ | good |
| 5 | $C_8F_{17}SO_2NHCH_2CH_2NH_2$ | good |
| 6 | $C_8F_{17}SO_2NHCH_2$-⟨C$_6$H$_4$⟩-$CH_2NH_2$ | poor |
| 7 | $C_8F_{17}SO_2NH(CH_2)_2NH(CH_2)_2NH(CH_2)_2NH_2$ | poor |

EXAMPLE 7

Twenty-five parts of each of the polyoxypropylene triols used in Example 3, 20 parts of a high molecular weight polyvinyl chloride (sold as PVC 71 AH, with an inherent viscosity of 1.30 and a specific viscosity of 0.057) and 17.8 parts of $Sb_2O_3$ were mixed together and the mixture dried under vacuum at 200°F. to less than 0.1 weight percent water. Twenty-five parts of the resulting mixture were then mixed with 0.2 part water, 0.015 part lead octoate, 1.0 part of a tetraborate catalyst, 0.3 part of the perfluoroalkylamine used in Example 1, to form a mixture, Part A. The tetraborate catalyst used was prepared as described in Example 4, except that 0.75 mole of potassium hydroxide was used instead of sodium, and the catalyst had a K/B atom ratio of 1/1. An isocyanate prepolymer, Part B, having a viscosity of 1840 cps. and an isocyanate number of 216, was prepared by reacting 155 parts of methylene bis(phenylisocyanate), (Isonate 125), with a mixture of 24 parts of a 200-molecular weight polypropylene ether glycol and 26 parts of a 2000-molecular weight polypropylene ether glycol. Parts A and B were placed in separate containers of a conventional pump-metering system for making urethane foams, and both parts were separately pumped at about 72°F. to a mixing head of a mixer operated at 5000 rpm. The Part A stream was fitted with a gas induction (injection) unit operating at about 130 cc/min. gas flow (at atmospheric pressure and 72°F.) to provide cell nucleation sites.

Part A was fed at a rate of 5 parts per min. to the mixing head and Part B was fed to the mixing head at 30 parts per min. The resulting mixture, having an NCO-/OH equivalent ratio of 6/1, was extruded from the mixing head at the rate of 35 parts per min. into a bun mold to produce a rigid urethane-modified polyisocyanurate having greater than 90% uniform closed isotropic cells and a density of 20.09 lbs./ft$^3$, the foam article measuring 6 inches × 20 inches × 5.5 feet. This foamed article had the equivalent of 1.67 isocyanurate linkages per urethane linkage. The foamed article was sawed with a band saw to form 1 inch × 12 inch × 5.5 foot planks which were sanded to a tolerance of ±4 mils.

Properties of the foam product are set forth below in Table IV.

TABLE IV

| | |
|---|---|
| Compression strength (10% deflection) | |
| at room temp. | |
|   parallel to foam rise | 1150 psi |
|   perpendicular to foam rise | 1000 psi |
| at 250°F. | |
|   parallel to foam rise | 570 psi |
|   perpendicular to foam rise | 530 psi |
| Compression modulus | |
| at room temp. | |
|   parallel to foam rise | 24,000 psi |
|   perpendicular to foam rise | 21,000 psi |
| at 250°F. | |
|   parallel to foam rise | 10,000 psi |
|   perpendicular to foam rise | 9,000 psi |
| Tensile strength | |
| at room temp. | |
|   parallel to foam rise | 850 psi |
|   perpendicular to foam rise | 755 psi |
| at 250°F. | |
|   parallel to foam rise | 525 psi |
|   perpendicular to foam rise | 435 psi |
| Elongation (at break) | |
| at room temp. | 6% |
| at 250°F. | 7-8% |
| Amt. of HCN evolved by pyrolysis (ca 1500°F.) | 0.015–0.03 wt. % |
| Dimensional stability (measured at rm. temp.) | |
|   volume increase after 2 hrs. at 350°F.[1] | 0% |
|   linear increase | |
|     after 2 hrs. at 200°F.[2] | 0.55 mils/in. |
|     after 2 hrs. at 250°F.[3] | 1.06 mils/in. |
|     after 2 hrs. at 300°F.[3] | 2.46 mils/in. |
| Smoke obscuration index[4] | 500–600 |
| Maximum smoke density[5] | 79% |
| Smoke density rating[6] | |
|   at 2 min. | 67.3 |
|   at 4 min. | 67.1 |
| Chemical resistance[7] | |
| Increase in weight | |
|   after 48 hrs. in JP-5 jet fuel | 5 wt. % |
|   after 24 hrs. under 2″ head of water | 3 wt. % |
|   after 10 days under 2″ head of water | 6.5 wt. % |
|   after 7 days in Skydrol 500A hydraulic fluid at 145°F. | 2 wt. % |
| Increase in volume | |
|   after 24 hrs. under 2″ head of water | 1.5 vol. % |
|   after 10 days under 2″ head of water | 2.5 vol. % |
| Flamability[8] | |
| self-extinguishing time after removal from flame | 4 sec. |
| char length | 4.5 in. |
| drippings | none |

[1] Value of 0% was obtained for each 3 samples.
[2] Value given is average for 12 samples run at 15″ Hg, 12 samples run at 20″ Hg, and 12 samples run at 28″ Hg.
[3] Value given is average for 36 samples run at 15″ Hg, 36 samples run at 20″ Hg, and 36 samples run at 28″ Hg.
[4] Determined after 4 min. in a National Bureau of Standards smoke density chamber on a 3″ × 3″ × ½″ sample
[5] Value given represents absorption as measured on a 1″ × 1″ × ¼″ sample in XP2 smoke density chamber.
[6] Values given are averages of 3 runs.
[7] All tests were run at room temp. except Skydrol test.
[8] Measured on 3″ × ½″ × 8″ sample immersed ¾″ in 1½″ flame of Bunsen burner (ca. 1500°F.) for 1 min.

EXAMPLE 8

The procedure of Example 7 was repeated a number of times by varying the relative amounts of Parts A and B that were mixed together, thereby varying the NCO/OH equivalent ratio and the density of the resulting foam product. Properties of these products are set forth below:

TABLE V

| Run | NCO/OH of reaction mixture | Density of foam, lbs/ft³ | Tensile strength at room temp., psi. | Elongation (at break) at rm. temp. % |
|---|---|---|---|---|
| 1 | 1.05/1 | 6 | 160 | 70 |
| 2* | 2/1 | 5 | 180 | 7 |
| 3 | 2/1 | 6 | 82 | 7.5 |
| 4 | 3/1 | 6 | 65 | 3.5 |
| 5 | 6/1 | 17 | 550 | 5 |

*This sample had compression strengths (10% deflection) at rm. temp., 200°F., 300°F., and −65°F. of 180, 30, 2.5, and 350 psi, respectively, these strength values being averages of samples cut both parallel and perpendicular to foam rise.

EXAMPLE 9

An isocyanate-terminated prepolymer was prepared by reacting 384 parts of melted ε-caprolactone polyester polyol (Niax D 540, having an average molecular weight of 1250 and a hydroxyl number of 90) with 104.5 parts of tolylene diisocyanate (80:20 mixture of 2,4 and 2,6 isomers) at 120°C. for 1 hr., after which the resulting prepolymer was cooled to room temperature. Twenty-five parts of this prepolymer were mixed with 0.4 part water, 0.3 part THANCAT DME tertiary amine, 2.0 parts of the catalyzed polyol described in Example 6, and 0.2 part of the perfluoroalkylamine used in Example 1. The mixture was stirred until it creamed and then was allowed to generate foam at room temperature, after which it was further cured at 150°F. for about 1 hr. The resulting flexible, soft, tough polyester polyisocyanurate foam was fairly uniform in cell structure.

Various modifications and alterations of this invention will become apparent to those skilled in the art without departing from the scope and spirit of this invention, and this invention should not be limited to that set forth herein for illustrative purposes.

I claim:

1. In a process for preparing a foamed isocyanate-derived polymer selected from the group consisting of polyurethane and polyisocyanurate-polyurethane, the improvement comprising forming said polymer in the presence of a foam stabilizing amount in the range of 0.1 to 20 weight percent of a foam stabilizer comprising a fluoroaliphatic radical-substituted compound having a plurality of active hydrogen atoms and 4 to 68 weight percent fluorine, said fluoroaliphatic radical having 4 to 20 carbon atoms, terminating in at least three fully fluorinated carbon atoms, and containing 40 to 78 weight percent fluorine.

2. The process according to claim 1 wherein said foam stabilizer has the formula $$(R_f)_m Q_z (H)_n$$

where $R_f$ is said fluoroaliphatic radical, H is an active hydrogen atom, Q is linkage free of active hydrogen atoms and having a valence of $m + n$, $m$ is an integer of at least 1, $n$ is an integer of at least 2, and $z$ is an integer of 1–3.

3. The process according to claim 2 wherein Q is selected from the group consisting of polyvalent aliphatic radicals, polyvalent aromatic radicals, oxy, thio, carbonyl, sulfone, sulfoxy, imino, and combinations thereof.

4. The process according to claim 1, wherein said foam stabilizer is selected from the group consisting of

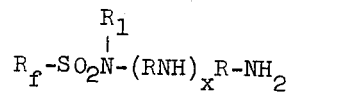

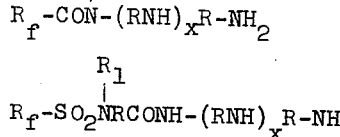

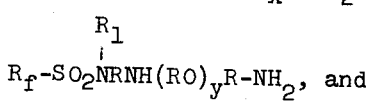

$R_f—(RNH)_x R—NH_2$ where $R_1$ is hydrogen or alkyl of 1–6 carbon atoms, R is alkylene of 2–12 carbon atoms, $x$ is zero or an integer of at least 1, $y$ is an integer of at least 1, and $R_f$ is perfluoroalkyl of 4–12 carbons.

5. The process of claim 4, wherein said perfluoroalkylamine is selected from the group consisting of $C_8F_{17}SO_2N(C_2H_5)(CH_2)_2NH(CH_2)_2NH(CH_2)_2NH_2$
$C_8F_{17}SO_2NHC_2H_4NH_2$

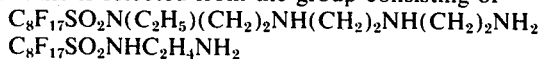

$C_7F_{15}CONHC_2H_4NHC_2H_4NH_2$
$C_8F_{17}SO_2NHCH_2CH_2NH_2$

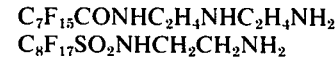

$C_8F_{17}SO_2NH(CH_2)_2NH(CH_2)_2NH(CH_2)_2NH_2$

6. The process according to claim 4, wherein said stabilizer comprises

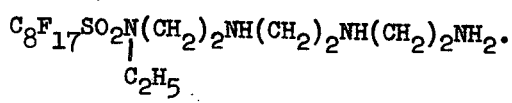

7. The process according to claim 1, wherein said isocyanate-derived polymer is prepared by trimerizing a polyisocyanate in the presence of a trimerization catalyst, blowing agent, and said foam stabilizer.

8. The process according to claim 1, wherein said isocyanate-derived polymer is prepared by reacting a mixture of a polyisocyanate and a fluoroaliphatic radical-free polyfunctional organic material containing active hydrogen atoms in the presence of a catalyst, blowing agent, and 0.1 to 5 weight percent of said foam stabilizer.

9. The process according to claim 8, wherein said mixture has an isocyanato-to-active hydrogen equivalent ratio of 0.9/1 to 12/1.

10. The process according to claim 8 wherein said mixture has an isocyanato-to-active hydrogen equivalent ratio of 2/1 to 12/1.

11. The process according to claim 8, wherein said catalyst comprises a urethane bond-forming catalyst.

12. The process according to claim 11, wherein said catalyst further comprises an isocyanate trimerization catalyst.

13. The process according to claim 12, wherein said trimerization catalyst is a coordination compound of an organic borate ester and an alkali or alkaline earth metal, or a hydride, alcoholate, phenolate, or carboxylic acid or hydroxide of said metal.

14. The process according to claim 12, wherein said trimerization catalyst is [B(O—CH$_2$CH$_2$—O—CH$_2$CH$_2$—O—CH$_2$CH$_2$—OH)$_4$]$^-$M$^+$, where M is a cation of sodium or potassium.

15. A process for making a foamed product, comprising reacting polyoxypropylene polyol and an isocyanate prepolymer based on polyoxypropylene polyol in the presence of a blowing agent, a catalyst comprising a coordination compound of sodium or potassium and a boric acid ester of triethylene glycol, said catalyst having a sodium or potassium to boron atom ratio of 2/1 to 1/2, and 0.1 to 5 weight percent C$_8$F$_{17}$SO$_2$N(C$_2$H$_5$)(CH$_2$)$_2$NH(CH$_2$)$_2$NH(CH$_2$)$_2$NH$_2$, the relative amounts of said polyoxypropylene polyol and isocyanate prepolymer reacted being sufficient to provide an NCO/OH equivalent ratio in the range of 3/1 to 12/1.

16. A foamed isocyanate-derived polymer produced in accordance with the process of claim 1.

* * * * *